Figure 4:
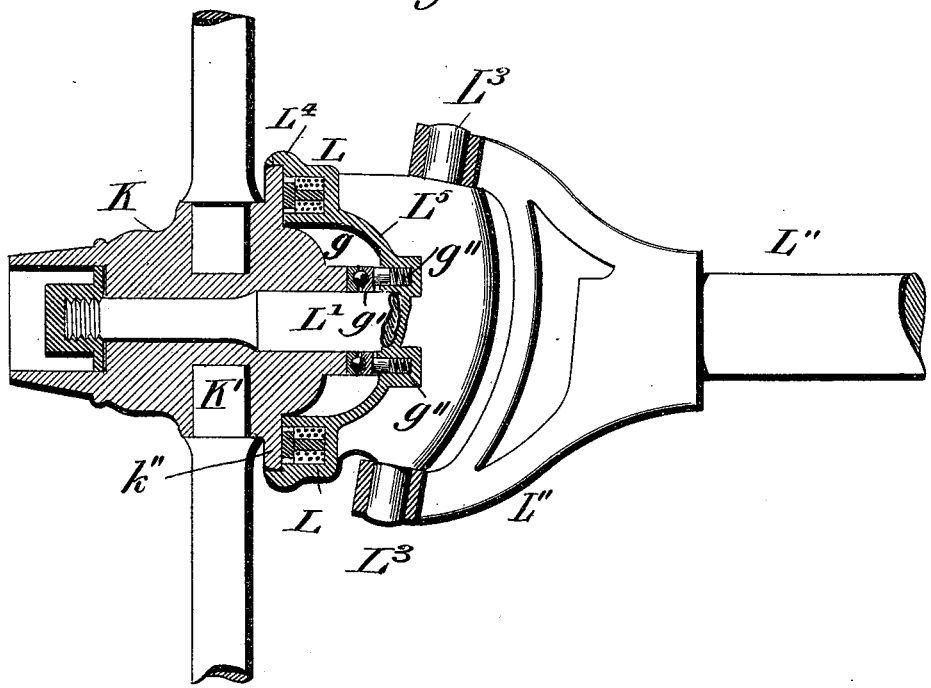

No. 645,903. Patented Mar. 20, 1900.
E. A. SPERRY.
MOTOR VEHICLE BRAKE.
(Application filed Oct. 30, 1899.)
(No Model.) 2 Sheets—Sheet 1.
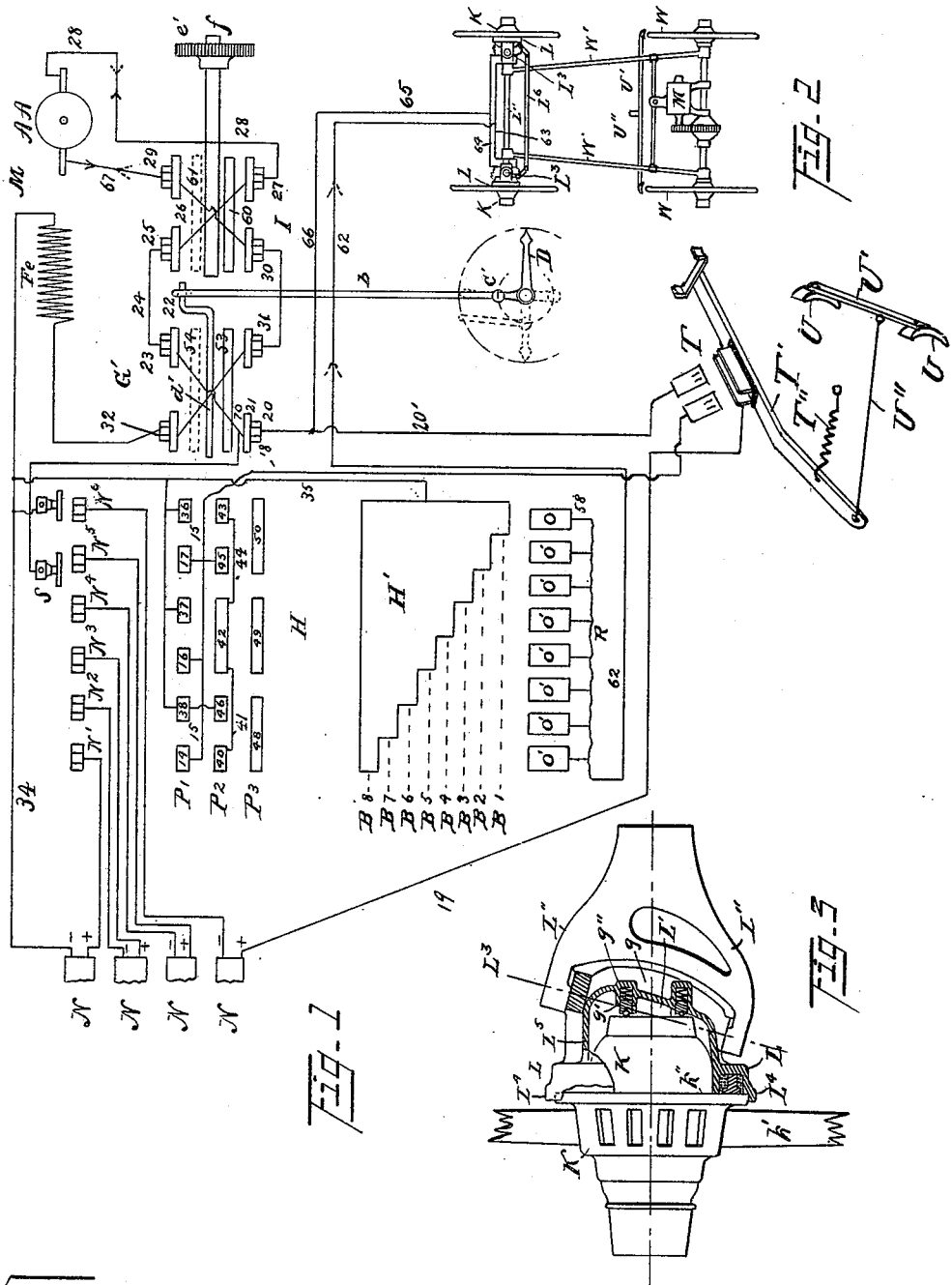
Witnesses:
F. Griswold.
Walter L. Upson.
Inventor.
Elmer A. Sperry.
by Buckingham & Ewart.

No. 645,903. Patented Mar. 20, 1900.
E. A. SPERRY.
MOTOR VEHICLE BRAKE.
(Application filed Oct. 30, 1899.)
(No Model.) 2 Sheets—Sheet 2.

Witnesses
L. C. Hills.
W. R. Taylor.

Inventor
Elmer A. Sperry
Attorney

UNITED STATES PATENT OFFICE.

ELMER A. SPERRY, OF CLEVELAND, OHIO.

MOTOR-VEHICLE BRAKE.

SPECIFICATION forming part of Letters Patent No. 645,903, dated March 20, 1900.

Original application filed September 16, 1899, Serial No. 730,692. Divided and this application filed October 30, 1899. Serial No. 735,168. (No model.)

*To all whom it may concern:*

Be it known that I, ELMER A. SPERRY, a citizen of the United States, residing at Cleveland, in the county of Cuyahoga and State of Ohio, have invented new and useful Improvements in Motor-Vehicle Brakes, of which the following is a specification.

My invention relates to motor-vehicle brakes; and it consists in various arrangements of parts and constructions of details, arrangements of circuits, and means for changing such relation, in connection with separate generating units, motor or motors, electric brakes, resistances, &c.

The invention has for its objects to combine in a single operating system for vehicles means for starting, varying the speed, and instantaneously stopping with the least possible inconvenience to the operator and without calling forth at any time an excessive effort on the part of the operator to place under his control power-brakes far more powerful than manually-actuated brakes and at the same time applying the brakes to all the wheels of the vehicle instead of the driving-wheels only, as heretofore. These objects are attained by mechanism, details, and circuits shown in the accompanying drawings, in which—

Figure 1 is a diagrammatic view of the electric circuits of the vehicle. Fig. 2 is a diagrammatic view of the running-gear of the carriage, showing motor and brake. Fig. 3 illustrates the electric-brake magnet applied to forward wheels, which in this case are steering-wheels. Fig. 4 is a vertical section of Fig. 3.

In the drawings like letters and numerals of reference indicate similar parts throughout the several views.

The system of control or arrangement of electrical circuits of the vehicle is shown in diagram in Fig. 1. It will be seen that the electricity is generated by separate units N N N N, each of which may represent a group of generators the positive and negative terminals of which are coupled, as shown, to the various circuit-manipulating devices. Their function and relation remain now to be pointed out in detail. To the right is observed the gear or segment $e'$, by means of which the controller-shaft $f$ is manipulated. On this shaft are mounted the reversing-switch I and the controller H, the controller having three active positions, one on either side of the "off" position, or position of rest, the latter having eleven active positions, three on the power side being indicated by P' P² P³, and B' to B⁸, as will be readily seen, indicating the brake positions. The brushes coöperating with these various contacts are illustrated by N' to N⁶, respectively, and those coöperating with the contacts B' to B⁸ are represented by O and O' O', &c. These are suitably connected to the resistance R, as indicated. The reversing-switch G' is seen mounted upon its shaft $d'$ and operated by the crank and link $b$ from the crank-pin C' and pointer D. On the two reversing-switches I and G' these contacts are shown with their electrical connections. Leading from the reversing-switch G' and also the controller H are flexible wires, (indicated by the waving lines,) which are numbered in the following description.

When the controller is so turned that the brushes N engage the row P' of contacts, it will be seen that the current flows through the motor in direction of the arrows as follows: Coming from each of the generators N, it reaches brush N', contact 14, wire 15, brush N³, contact 16, wire 15, brush N⁵, contact 17, wire 15, flexible wire 18, and from the last generator by wire 19, switch T, wire 20' to brush 20. Suppose now that the reversing-switch be in the position shown in Fig. 1. The current will enter contact 21, contact 22, brush 23, wire 24, brush 25, contact 26, contact and brush 27, wire 28, through the armature A A of the motor to brush 29, (in the direction of the arrow-heads in full lines,) to brushes 30, 31, and 32, field Fe, wire 34 to the negative of the first battery, and wire 35 (part of which is flexible) to contacts 36, 37, and 38 to brush N², returning the current to the second generator, brush N⁴, returning the current to third generator, and brush N⁶, returning current to fourth generator, which will thus be seen to have been coupled to the motor in parallel.

It will readily be understood that the relation between the reversing-switch I and the controller H is fixed and the direction of the current through it is always as indicated in any of the three power positions.

Taking now the second power position, obtained by turning the controller in such a way that the brushes N' to N⁶ rest upon the second row of contacts—viz., P²—we notice that the current generated by the first generator N arrives at brush N', contact 40, wire 41, and the current coming from the second generator arrives at N³, contact 42, passes back through brushes N⁴ and N⁶, the latter by way of contact 43 and wire 44 to the lower pair of generators, from whence it flows to the brush N⁵, contact 45, wire 15, and thence, as before, by flexible wire 18, joined by current from the last generator, passing wire 19, switch T, and wire 20' to contact 20 and thence through the motor or motors back to the negative terminals of the first two generators by wires 34 and 35 to contact 46, brush N² to the negative of the second generator N, at which point the circuit is complete. Thus it will be seen in this position the motor or motors receive current from two of the generators in multiple coupled in series with two other of the generators.

When the controller is turned to the position P³, the generators are then all in series, the current passing as follows: from the positive of the first generator to brush N', contact 48, brush N²; second generator, brush N³, contact 49, brush N⁴; third generator, brush N⁵, contact 50, brush N⁶; fourth generator, wire 19, switch T, wire 20', brush 20 to motor and fields and back to the first generator by wire 34, exactly as above pointed out in reference to the two other power positions. Furthermore, it will be seen that if the reversing-handle D is so operated that the long contacts 53 and 54 are brought under the brushes 20, 23, 31, and 32, in this case the current arriving at brush 20 will pass over on contact 53 to brush 31, and therefore pass the armature in the directions opposite that just described and not resume the original direction until it again arrives at brush 32, thus giving a complete reversing action to the motor or motors M connected. It will thus be seen that the motor is a reversible motor and when reversed while in motion may become a generator, the currents acting through circuits described in following specification.

It will be noticed from the figures that upon the controller being turned backward, so that the contacts H' and the brush O or any of the brushes O' are in contact, a new set of contacts—viz., the long contacts shown at 60 and 61, respectively—will be brought in contact with the brushes 25, 27, 29, and 30, which again reverses the connections of the armature or armatures and field, the reversing-switch G' remaining in either of its positions unchanged, and it is this reversal action of the reversing-switch I which is depended upon to convert the motor or motors M into generators. Assuming now that the generation of current is going forward and that one of the brushes O' is in contact with the segment H', the circuit traversed by the current will be seen to be as follows: Emanating at brush attached to wire 28, it will flow backwardly through wire 28, as indicated by the dotted arrow-head, brush 27, contact 60, brush 30, brush 31, thence following the circuits through the field Fe to wire 34 35, segment H', off the farthest brush to the left O', which happens to be in contact at the instant with the segment H', through the resistance R, wire 62, in direction of the dotted arrow-heads, arriving at wire 63, passing the flexible wires into the brake-magnet LL, back by wire 64, joining and passing up to wire 65, wire 66 to wire 20', brush 20, contact 21, contact 22, brush 23, wire 24, brush 25, contact 61, brush 29, wire 67, in direction of the dotted arrow-head to the opposite brush of the motor or motors M, thus completing the circuit. The switch T will be thus seen to be connected by wire 20' to the motor-circuit in which it is directly inserted. The motor-circuit becomes the generator-circuit when the brakes are applied, and it will be seen that the switch T still is in electrical connection with this circuit and is also directly in electrical connection with wire 66, which is purely an electric-brake connection. The amount of current thus flowing will be dependent, first, upon the speed of the motor or motors, and, secondly, upon the amount of resistance R included in the circuit. The mechanical energy required for rotation of the armature or armatures A A of the motor, which are geared in the driving-wheels $w$ $w$ of the carriage, will effectually retard their motion and tend to bring the carriage quickly to rest, aided materially by the retardation of the forward wheels by the brake-magnets L L, as will readily be understood.

Attention is specially called to the fact that the forward wheels are supplied with braking devices operated by the electric current, which may be generated in any suitable manner—as, for instance, that just described.

From the fact that retardation of motion is commenced, the mass, the center of gravity of which is usually high above the ground, pitches forward, bringing a large portion of the weight over and upon the forward wheels, and removing a corresponding amount from the back wheels. It will be seen that, during the time of braking, the forward wheels, bearing, as they do, a materially-increased amount of the load, are the most important factors in stopping, and their retardation will tend to bring the mass to rest quicker than an equal amount of retardation brought to bear upon the rear wheels.

Turning now to the detail of the electric brake indicated in Figs. 3 and 4, it will be noticed that the hub K of the wheel, while serving to secure the spokes K' in position, offers the lateral surface of a disk $k''$ to the brake magnets or magnet L, which may be of circular or crescent shape, fully described in former patents to me. (See Nos. 534,974, 534,977, and 565,937.) This magnet I prefer to constitute the stationary element, allowing the disk $k''$ to rotate. However, the reverse of this arrangement would be entirely operative and effectual. The journal or axle proper, L', of the wheel in this instance is short and pivoted on the axis $L^3$ to a member of the framework or running-gear of the vehicle, (shown at L'',) and it is to this short axle that the magnet is secured in such a manner as to swivel with the axle and wheel. A thrust-bearing is indicated at $g$, the balls being plainly seen and the race $g'$ being served by the springs $g''$ $g''$. This thrust-bearing may be one ordinarily found in a buggy-wheel; but I prefer to use a resilient feature in connection with it in such a manner as to force the surface of the disk $k''$ and magnet L apart. A dust-guard is seen at $L^4$ for the purpose of preventing ingress of foreign substance, and the back inclosure or the inner part of the disk or its projections—viz., the hub K—is preferably entirely incased by the housing $L^5$, incasing also the thrust-bearing $g$.

The mounting of the brake-wheels with reference to the running-gear is shown, as a whole, in diagram in Fig. 2 and will be seen to be at the forward end or the end away from motor M. The swivels $L^3 L^3$ are here plainly seen at the ends of the forward member of the framework of the vehicle or running gear. (Seen at L'' L''.) Here also may be seen the circuits of the brake-magnet, indicated by the wires numbered 63 64, which are shown as being flexible around the pivots $L^3 L^3$ and are there secured to a stationary part of the vehicle—such, for instance, as the frame L'', running-gear, or body.

The switch T, it will be seen, is carried by the arm T', which serves to operate the mechanical brakes U U of the vehicle. These are carried by the brake-beam U' and connected to the arm T' by a link U'', retracted by spring T''. By tracing the circuits it will be seen that the brake-circuits are connected to those controlled by the switch T, and thus through the arm T' the mechanical-brake and the electrical-brake systems are interrelated.

It will be readily understood that while it is designed to use the above parts in the relation shown, yet some may be used without the others, and the invention extends to such use. It will furthermore be readily understood that while the detailed construction has been described with more or less minuteness, yet the invention should be in no wise restricted to the exact methods and details described, but rather should be limited only in scope as indicated in the claims.

The present application constitutes a division of my prior patent, No. 641,412, dated January 16, 1900, for a system of electric circuits and brakes for vehicles.

Having thus described my invention, what I claim as new, and desire to secure by Letters Patent, is—

1. In an electric-motor vehicle, an electric-brake magnet for arresting the motion of a revolving vehicle-wheel, mounted rigidly upon an axle, a wheel loose upon said axle and means for retracting the magnet from the wheel.

2. In an electric-motor vehicle, an electric-brake magnet for arresting the motion of a revolving wheel, mounted rigidly upon an axle, a wheel loose upon said axle, a thrust-bearing between the wheel and axle and an elastic medium between the bearing and the axle.

3. In an electric-motor vehicle, an electric-brake magnet for arresting the motion of a revolving vehicle-wheel, mounted for non-rotation upon an axle, a wheel loose upon its axle, a revolving disk upon the wheel and a housing connecting the magnet with the axle, for inclosing the inner portion of the disk.

4. In an electric-motor vehicle, an electric-brake magnet for arresting the motion of a revolving vehicle-wheel, mounted rigidly upon an axle, a wheel loose upon said axle, a revolving disk upon the wheel, a housing connecting the magnet with the axle for inclosing the inner portion of the disk and a thrust-bearing between the wheel and axle within the housing.

5. In a vehicle, a swiveling steering-wheel, a braking-face attached to the wheel, a non-swiveling axis for the steering-wheel, a non-rotating axle-dash portion swiveling with the wheel and a coöperating brake mounted upon said axle-dash portion.

6. In a vehicle, a swiveling steering-wheel, a brake for the wheel, a non-swiveling axis for the steering-wheel, a non-rotating swiveling axle-dash portion for carrying the brake and means extending to a non-swiveling axle-dash portion for applying the brake.

7. In a vehicle, a swiveling steering-wheel, an axle therefor, a separate non-swiveling axle for the vehicle, a wheel thereon, retarding means for each wheel and means mounted upon the non-swiveling member for controlling the retarding means.

8. In a vehicle, a swiveling steering-wheel, an axle therefor, a separate non-swiveling axle for the vehicle, a wheel thereon, retarding means for each wheel and a common means for controlling the retarding means.

9. In a vehicle, a swiveling steering-wheel, a braking-surface for the wheel, a non-rotating swiveling portion, acting as a journal for the wheel, a swiveling pivot and an electric-brake magnet mounted upon the said portion between the wheel and the pivot.

10. In a vehicle, swiveling steering-wheels, an axle or axles therefor, brakes for such wheels, a separate non-swiveling axle and wheels therefor, means for retarding the last-named wheels, in combination with independent mechanical brakes applied to two of the vehicle-wheels.

11. In a vehicle, swiveling steering-wheels, an axle or axles therefor, brakes for such wheels, a separate non-swiveling axle and wheels therefor, means for retarding the last-named wheels, in combination with independent mechanical brakes applied to the driving-wheels of the vehicle.

12. In a vehicle, swiveling steering-wheels, brakes for such wheels, a separate non-swiveling axle and wheels therefor, means for retarding the last-named wheels, in combination with independent mechanical brakes applied to two of the vehicle-wheels and operating connections between the retarding means and the independent brakes, substantially as specified.

In testimony whereof I have hereunto set my hand in presence of two subscribing witnesses.

ELMER A. SPERRY.

Witnesses:
W. S. ROGERS,
M. C. PENDERGAST.